United States Patent [19]

Köhler

[11] 4,406,065
[45] Sep. 27, 1983

[54] CUTTING HEAD FOR A FREE-CUTTING DEVICE

[75] Inventor: Gisbert Köhler, Waiblingen, Fed. Rep. of Germany

[73] Assignee: Andreas Stihl, Waiblingen, Fed. Rep. of Germany

[21] Appl. No.: 347,253

[22] Filed: Feb. 9, 1982

[30] Foreign Application Priority Data

Feb. 12, 1981 [DE] Fed. Rep. of Germany ....... 3105003

[51] Int. Cl.³ ............................................ A01D 55/22
[52] U.S. Cl. ..................................... 30/347; 56/12.7
[58] Field of Search ..................... 30/347, 276; 56/12.7

[56] References Cited

U.S. PATENT DOCUMENTS

| | | | |
|---|---|---|---|
| 3,190,064 | 6/1965 | Wenzel | 56/12.7 X |
| 3,505,800 | 4/1970 | McCanse | 56/12.7 X |
| 3,527,038 | 9/1970 | Wood | 56/12.7 X |
| 4,086,700 | 5/1978 | Inada | 30/347 |
| 4,171,724 | 10/1979 | Steele | 30/347 |
| 4,194,287 | 3/1980 | Palmieri | 56/12.7 X |

Primary Examiner—Jimmy C. Peters
Attorney, Agent, or Firm—Becker & Becker, Inc.

[57] ABSTRACT

A cutting head, especially grass cutting head for a free-cutting device having a main body which essentially comprises two discs spaced axially from each other and rigidly connected with each other; between and approximately parallel to the discs are arranged at least two pivotally mounted, blade-like cutting tools which, during rotation of the cutting head, project beyond the peripheral edge of the discs and, because of the arising centrifugal force, align themselves radially outwardly. A pivot pin is rigidly connected with the cutting tool; the pivot pin extends upwardly and downwardly beyond the cutting plane, and is held approximately parallel to the axis of rotation and is partially surrounded by bearing seats of the discs; these bearing seats are located axially across from each other and are open approximately toward the axis of rotation of the cutting head.

28 Claims, 4 Drawing Figures

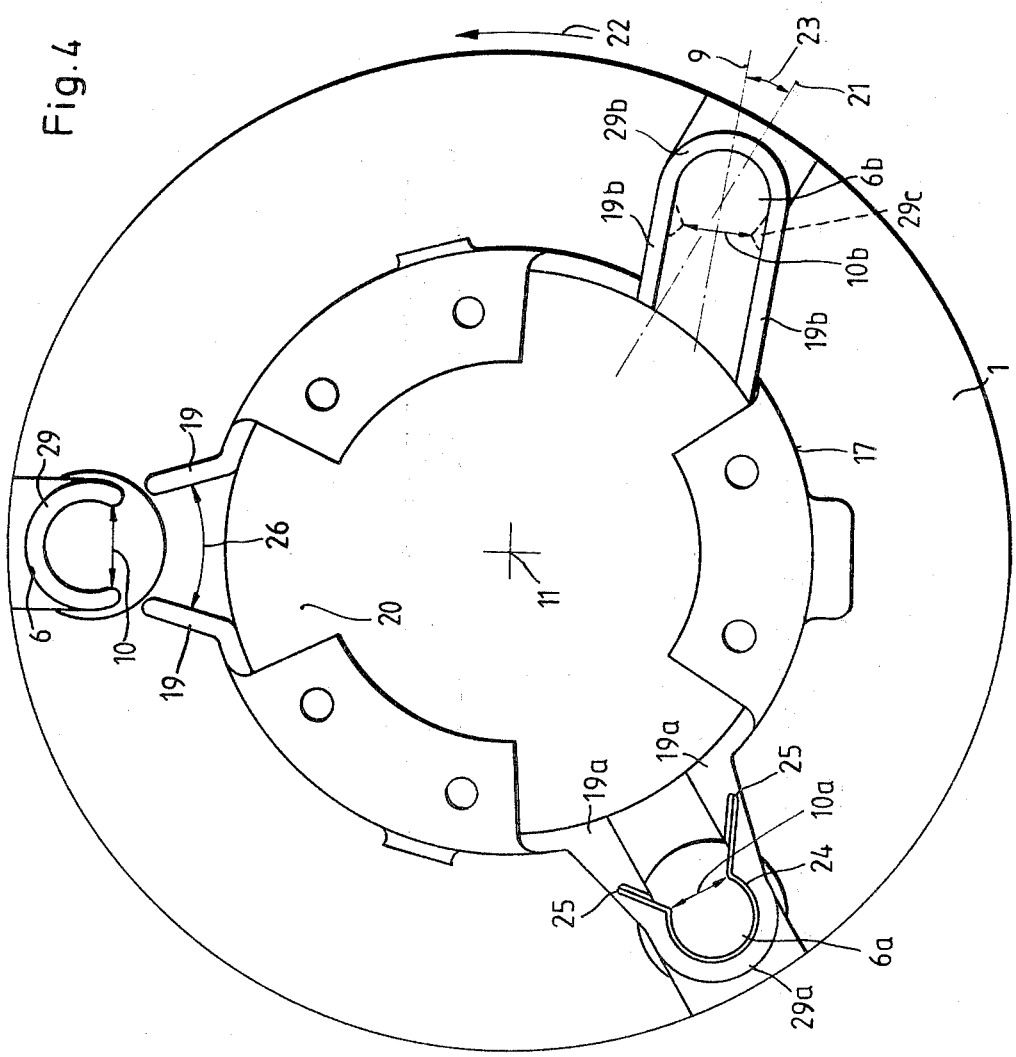

CUTTING HEAD FOR A FREE-CUTTING DEVICE

The present invention relates to a cutting head, especially a grass cutting head for a free-cutting device having a main body which essentially comprises two discs spaced axially from each other and rigidly connected with each other; between and approximately parallel to the discs are arranged at least two pivotally mounted, blade-like cutting tools which, during rotation of the cutting head, project beyond the peripheral edge of the discs and, because of the arising centrifugal force, align themselves radially outwardly.

Such a cutting head is disclosed, for instance, in German Offenlegungsschrift No. 25 56 553. A bolt passes through one end of the cutting tool, a cutting blade; this bolt is fixed in the main body, and the cutting tool is thus held rotatably on the main body. To change the blades, the bolts, after removal of conventional security elements, must be forced or knocked axially from their mounting in the main body, after which the old blade can be removed and the new blade inserted, whereby the new blade is again pivotally secured by inserting a new bolt or the old bolt.

To remove and secure the bolt, accompanied by the use of special tools, several operations are necessary, so that changing the blades is relatively time consuming. If in addition the old bolt is to be reused, it must be recovered during removal thereof, since otherwise it is lost, for instance in the grass which is to be cut.

It is an object of the present invention to make the cutting head for a free cutting device in such a manner that the blade-like cutting tools can be easily manually changed or replaced without any additional tools, yet during operation of the cutting head are held securely in a suitable mounting or seating.

This object, and other objects and advantages of the present invention, will appear more clearly from the following specification in connection with the accompanying drawings, in which:

FIG. 4 is a plan view of a lower disc-shaped part of the cutting head in the direction of arrow 50 in FIG. 2, showing different embodiments of bearing seats.

Figure 1:
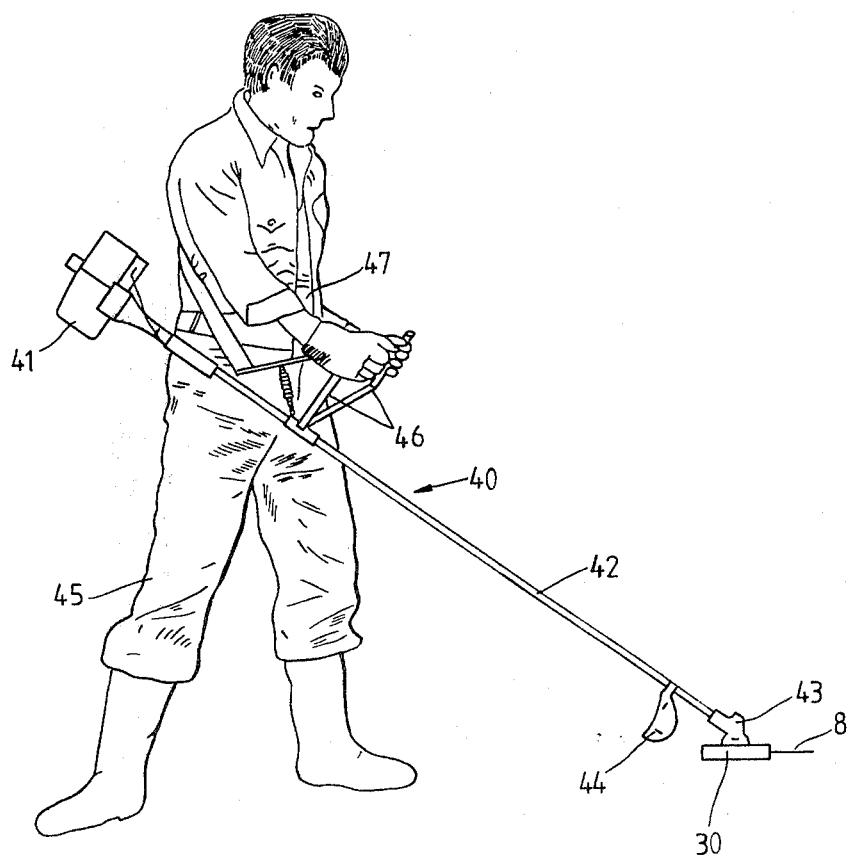
FIG. 1 shows a free-cutting device with a cutting head in accordance with the present invention.

The cutting head of the present invention is characterized primarily in that a pivot pin is rigidly connected with the cutting tool; the pivot pin extends upwardly and downwardly beyond the cutting plane, and is held approximately parallel to the axis of rotation and is partially surrounded by bearing seats of the discs; these bearing seats are located axially opposite one another and are open approximately toward the axis of rotation of the cutting head.

Changing the blade-like cutting tools is quickly and simply possible via such a mounting by a simple manual action without additional auxiliary means. Because of the arrangement in accordance with the present invention, there results in the seating or mounting a pressure which is less than that with known embodiments. Furthermore, a better heat transfer to the main body of the cutting head is assumed due to the inventive mounting. The blade-like cutting tool is advantageously unitary with the pivot pin, preferably being die cast. In this way, a simple economical mass production of a cutting tool for a cutting head is made possible, so that the operating costs of a cutting head resulting from blades wearing out are relatively low.

The bearing seats advantageously surround the pivot pins by more than 180° and less than 270°, preferably by about 200°. Such a mounting makes possible a rigid seating of the pivot pin, so that even under unfavorable operating conditions, a releasing or loosening thereof from the bearing seats is prevented.

Guides are advantageously provided to the right and left in front of the opening of the bearing seats; these guides extend approximately radially, and prevent the cutting tools from being ejected from the cutting head if the pivot pins become loosened or released from the bearing seats as a result of possible sudden loading. Furthermore, these guide elements make it possible to insert the pivot pin without costly mounting operations.

Since the guide elements are extensions of the wall of the bearing seats, a blade which possibly becomes ejected or knocked out of a bearing seat can automatically be pressed-in again into the bearing seats with its pivot pin under the influence of the centrifugal force.

In order to be able to absorb or take up sudden loads, which are effective radially inwardly on the cutting tool, through the intervention of the wall of the bearing seat or of the guide elements, the axis of symmetry of the bearing seat, and preferably also the guide elements, is arranged at an angle to the radial. Preferably, the axis of symmetry precedes the radial by 5° to 25° in the direction of rotation.

According to further specific embodiments of the present invention, the pivot pin may be unitary with the cutting tool at one end thereof. As mentioned above, the cutting tool may be die cast unitary with the pivot pin.

Axial grooves may be provided in the peripheral surface of the pivot pin, preferably over the entire axial length thereof.

The bearing seat may be unitary with the disc which supports it. The outer mantle of the bearing seat may be aligned approximately axially with the peripheral edge of the disc.

The wall of the bearing seat may merge into the guide elements.

The guide elements may be spaced from one another by a distance corresponding to the diameter of the pivot pin, and are preferably spaced from one another by a slightly greater distance.

The guide elements may form an opening angle. In addition, the guide elements, proceeding from the bearing seat, may decrease in height in the radial direction.

The pivot pin may be resilient in the radial direction. The pivot pin may also be hollow.

A radially flexible metallic band may be arranged in the bearing seat with radial play relative to the wall of the bearing seat, with the metallic band surrounding the pivot pin in a range of more than 180° up to 270°. The ends of the band may be secured in the wall of the guide elements.

The opening of the bearing seat may be radially elastically spreadable.

The bearing seats may be made of an elastic synthetic material, preferably of a thermoplastic synthetic material.

The bearing seats may be lined with a wear-resistant material, preferably a spring steel plate.

The main body of the cutting head may be unitary or in one piece, preferably being extruded.

The end faces of the pivot pins may be slightly axially spaced from the discs, and the wall of the bearing seat may be spaced from the cutting tool.

Referring now to the drawings in detail, the trimming or cutting head 30 of the present invention is arranged on a free-cutting device 40, as shown in FIG. 1, and serves to cut grass, weeds, or the like. The free-cutting device 40 essentially comprises a drive motor 41, which drives a shaft located in a rigid tube 42; the cutting head 30 is rotatably moved by the shaft via a miter-wheel gearing 43, so that the blades 8 of the cutting head align themselves radially outwardly due to the effective centrifugal force.

The tube 42 is rigidly connected with the drive motor 41, and serves furthermore to hold and guide the free-cutting device 40. A holding belt or shoulder strap 47 is anchored to the tube 42 for carrying the free-cutting device; this belt 47 is placed over the shoulder of the operator 45. The free-cutting device 40 is guided by the operator by means of two handles 46 which are rigidly arranged on the tube 42.

The tube 42 is furthermore provided with a deflecting plate 44, by means of which particles flung or thrown from the rotating cutting head 30 are kept away from the operator to avoid injuries.

Figure 2:
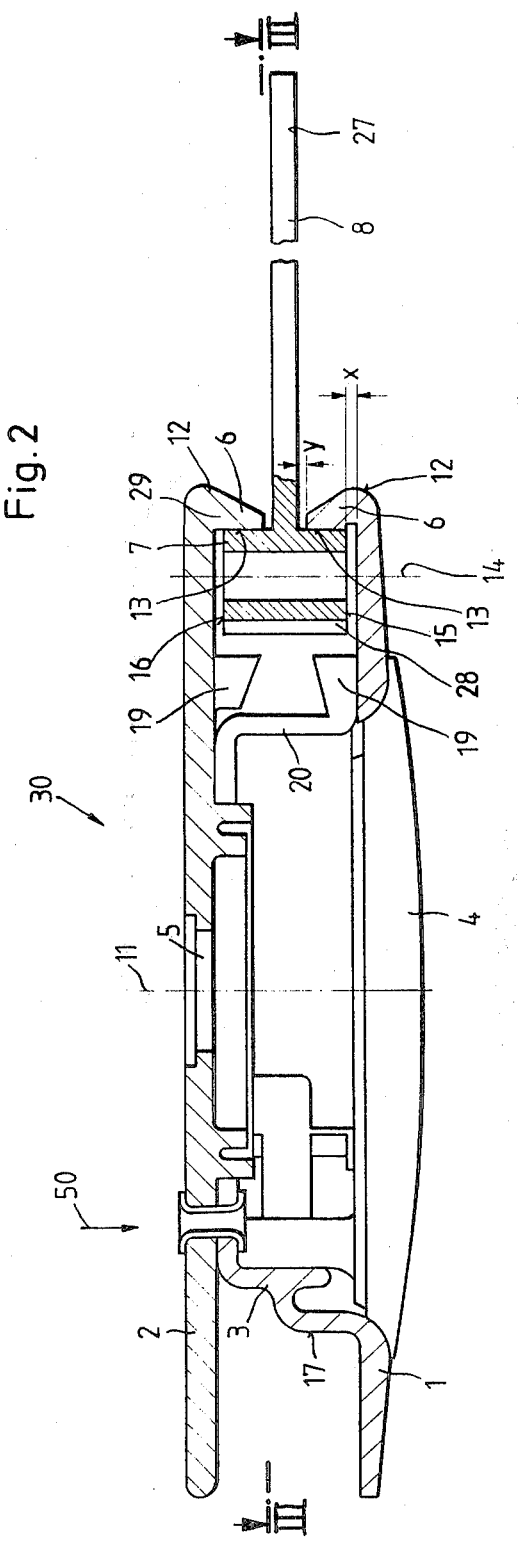
FIG. 2 is an enlarged illustration of an axial section through the cutting head taken along the line II—II in FIG. 3.

The main body of the inventive cutting head 30 essentially comprises two disc-shaped parts 1 and 2, as recognizable in FIG. 2. The lower disc 1 is provided with a hub-like body 3 which is rigidly connected with the disc 2 so that the two discs 1 and 2 are spaced from each other.

The described, or also a similar main body, can advantageously also be unitary, preferably being die cast or cast of aluminum, for example.

The assembled cutting head, which is mounted via the opening 5 in the upper disc 2 on the miter-wheel gearing 43 of the free-cutting device 40, is closed off by a cap 4 which essentially closes the opening of the hub-like body 3 and protects the inner chamber of the cutting head 30 against penetration by foreign bodies, which cause an unbalance.

Figure 3:
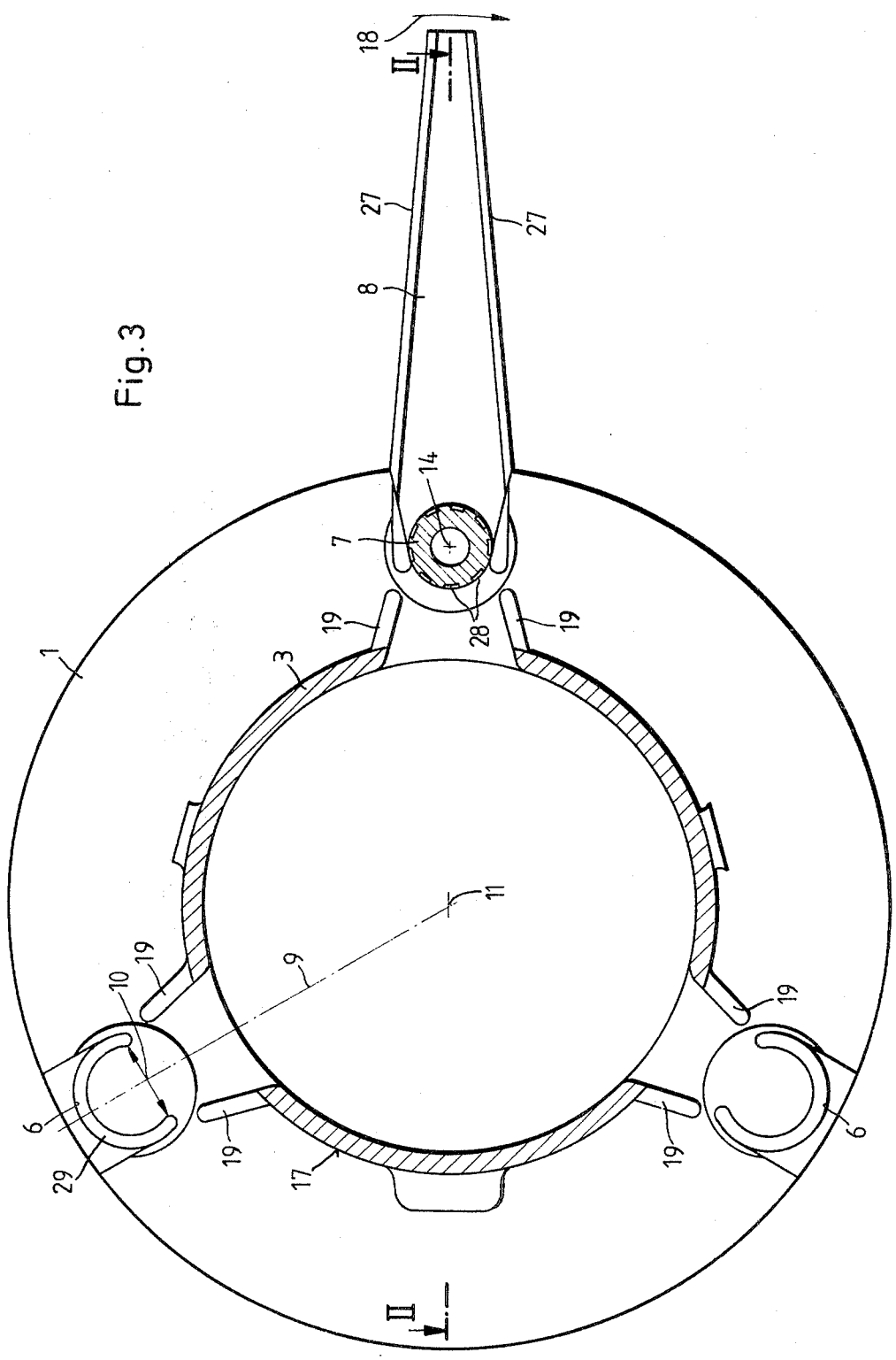
FIG. 3 is a section through the cutting head taken along line III—III in FIG. 2.

As shown in FIGS. 3 and 4, the discs 1 and 2, on those sides facing one another, are respectively provided with axially opposed bearing seats 6 which are preferably unitary with the associated disc 1 or 2. In one simple embodiment, the bearing seats 6 are slightly larger than a semicircle, with the opening 10 thereof respectively facing the axis of rotation 11 of the cutting head (FIGS. 3 and 4).

In the illustrated embodiment, three bearing seats 6 are respectively arranged on a disc, so that with an assembled main body, three bearings or mountings are formed for three blades 8. Naturally, embodiments with more or fewer bearing seats are also possible within the scope of the present invention.

A blade 8 which is to be pivotally fastened in the cutting head 30 is provided with a pivot pin 7 located at right angles to the cutting plane; the pivot pins 7 project axially upwardly and downwardly beyond the cutting plane defined by the cutting edges 27 of the blade 8. Preferably, the blade 8 is unitary with the pivot pin 7, preferably being integrally die cast with the pivot pin 7. In this way, a simple, economical manufacture of the blades 8 as mass produced goods is made possible.

As shown in FIG. 2, axial grooves 28 are distributed over the periphery of the pivot pin 7, so that the effective outer peripheral surface of the pivot pin 7 is reduced, as a result of which friction thereof in a bearing seat 6 is considerably reduced during a pivotal movement in the direction of arrow 18 in FIG. 3. In this way, the pivot pin 7 can have a larger diameter with less friction, so that the pivot pins 7 can take up greater forces, thus making it possible to have higher speeds of the cutting head. Therefore, greater and better cutting efficiencies are attainable with cutting heads 30 which have such blades by means of the possible high rotational speed of the head. Because of the low friction, the blade 8, upon striking an obstacle, retreats or gives way counter to the direction of rotation 22 (FIG. 4) without any great damage occurring to the cutting edge.

The bearing seats 6 surround the pivot pin 7 of an installed blade 8 by more than 180°, preferably 200°, whereby a secure holding of the blade in the cutting head is assured. In the embodiment according to FIG. 3, the axis of symmetry 9 of a bearing seat 6 corresponds with one of the radii originating with the axis of rotation 11.

The wall of the bearing seat 6 is axially approximately in alignment with the peripheral edges 12 of the discs 1 and 2. The inner walls 13 of the opposing bearing seats 6 of two discs 1 and 2 are also aligned, so that the inserted pivot pin 7 is oriented in the bearing seats 6 in such a way that its axis 14 is approximately parallel to the axis of rotation 11 of the cutting head.

A small space x is respectively provided between the axial end walls 15, 16 (FIG. 2) of the pivot pin 7, and the discs 1 and 2. Similarly, the walls of the bearing seats 6 are spaced by the distance y from the top and bottom side of the blade 8, so that the blade 8 is easily movable vertically in order, for instance upon striking obstacles, to be able to move out of the way upwardly or downwardly. Moreover, with the advantageously provided tolerances x and y, a simple mass production of the blade with a pivot pin is possible without manufacturing tolerances causing difficulties during installation of the mass produced blade.

Between the opening 10 of a bearing seat, and the hub wall 17, there must be provided a radial spacing which corresponds at least to the diameter of the pivot pin 7 in order, by means of a movement in the peripheral direction of the disc, to be able to place the pivot pin before the opening 10, and to subsequently be able to manually introduce it into the bearing seat. Preferably, an opening 20 is provided for this purpose in the hub wall 17; this opening is arranged in such a way that the pivot pin 7, by introduction into this opening 20, can be brought into position relative to the opening 10 of the corresponding bearing seat 6.

Since the inventive bearing seats 6 have an opening angle of less than 180°, the pivot pins 7 must be forced into the bearing seats 6 by a radial force, for instance by appropriate pulling on the blade 8. In this connection, it is advantageous, with the provided small opening angle of the opening 10, to embody the bearing seat suitably radially elastic in order to make possible at all an insertion of the pivot pin.

The bearing seats 6 are advantageously embodied in such a way that they surround the insertable pivot pin 7 by more than 180°, though not by more than 270°, and thus securely hold the pivot pin 7.

A cutting head equipped with blades 8 in this way, in which connection neither tools nor other auxiliary means are needed for insertion and disassembling of the blades, is rotatably driven about the axis of rotation 11, so that, because of the occurring centrifugal force, the blades 8 are oriented radially and project beyond the peripheral edges 12 of the cutting head. The cutting head is guided in such a plane that all blades 8 are essentially effective in one cutting plane. A blade 8, upon striking an obstacle, can give way without the blade being materially damaged as a result of the blade mounting, which permits a pivotal movement in the direction of the arrow 18, and which also makes possible as described previously, a vertical movement within limits.

Advantageous embodiments of the bearing seats are provided according to FIG. 4 in order to also be able to absorb radially inwardly directed forces on the blade. The bearing set 6a corresponds to the standard bearing seat 6 with an opening 10a which faces the axis of rotation. The wall 29a of the bearing seat 6a merges into guide elements 19a which, proceeding from the opening 10a, advantageously slope toward the disc 1. The guide elements 19a are spaced from each other by a distance which essentially corresponds to the diameter of the pivot pin to be installed, or to the diameter of the bearing seat 6a. A flexible metallic strip 24 is inserted in the bearing seat, and the ends of this metallic strip 24 are secured in grooves 25 of the guide elements 19a. The metal strip 24 forms the opening 10a of the bearing seat 6a and surrounds the pivot pin by more than 180°. The metal strip 24, at least at its angled-off, ends, is slightly spaced from the wall 29a, so that during insertion of a pivot pin, an elastic spreading of the metal strip 24 is possible.

The bearing seat 6b in another embodiment is arranged in such a way that its axis of symmetry 9, which at the same time is the axis of symmetry of the guide elements 19b, forms an angle 23 relative to the radius 21 in the peripheral direction of the disc 1. Advantageously, also with this embodiment the bearing seat 6b is constructed in such a way (see dashed line of wall 29c) that its opening 10b is greater than 90°, though smaller than 180°. A bearing seat constructed according to the bearing seat 6b assures a secure holding of the blade 8 or of the pivot pin 7, even at extreme operating conditions.

The bearing seat 6b is advantageously constructed in such a way that the line of symmetry 9 of the radius 21 leads, when viewed in the peripheral direction 22, whereby an angle of preferably 5° to 25° to the radius is formed. Such construction assures a secure holding of the pivot pin under all operating conditions.

The bearing seat 6 of FIG. 4 corresponds essentially to the bearing seats shown in FIG. 3. Preferably, the guide elements 19 are arranged in such a way that they form an opening angle 26 with each other. In this connection, the opening of the guide elements 19 is considerably wider than the diameter of a pivot pin which is to be inserted, so that the insertion or installation of a blade is possible without time consuming, complicated, mounting operations. The outlet of the guide elements is directly across from the opening 10 of the bearing seat 6; preferably, the guide elements merge into the wall of the bearing seat 6. In doing so, the guide elements are rounded-off radially inwardly.

All of the guide elements 19, 19a, 19b provided extend essentially inwardly in the radial direction.

The cutting head and the bearing seats are advantageously produced of synthetic material, preferably thermoplastic synthetic material, which makes possible a very simple and economically advantageous production, and gives the bearing seats the elasticity necessary for insertion of the pivot pins. The bearing seats are therefore lined with a wear-resistant material, preferably with a spring-steel plate, so that the bearing seats are protected against wear.

The opening 10, 10a, 10b of the bearing seat is elastically spreadable in order to make it possible to insert the pivot pin 7 into the bearing seat 6. This can be achieved by an inserted spring-steel strip which forms the opening; the spring-steel strip lies in the bearing seat 6 with appropriate radial play. (The opening of the bearing seat 6 in so doing is preferably 180°.) An elastic or resilient construction of the bearing seat is also possible. Conversely, it is also feasible to construct the opening 10 of the bearing seat 6, or the bearing seat 6 itself, stiff, and to provide a corresponding radial elasticity for the pivot pin 7.

The present invention is, of course, in no way restricted to the specific disclosure of the specification and drawings, but also encompasses any modifications within the scope of the appended claims.

By way of example only, the bearing seats 6, as well as the cutting head 30 proper, can be made of a glass-fiber-like polyamide. Also by way of example, the metallic strip 24 can be made of a spring steel.

What I claim is:

1. A rotatable cutting head, comprising:
   a main body which includes two discs spaced axially from, and rigidly connected with, each other;
   at least two blade-like cutting tools pivotally mounted between and approximately parallel to said discs; said cutting tools, during rotation of said cutting head and as a result of the centrifugal force which arises, aligning themselves radially outwardly and projecting beyond the radially outer peripheral edges of said discs;
   for each cutting tool, a pivot pin respectively rigidly connected therewith, said pivot pin projecting beyond both sides of the cutting plane of the associated cutting tool; and
   bearing seats arranged in pairs, each bearing seat of a pair being located axially across from one another on those sides of each of said discs which face one another, said bearing seats being open approximately in the direction facing the axis of rotation of said cutting head; each pair of said bearing seats partially surrounding the projecting portions of an associated pivot pin, so that each pivot pin is held between said discs by a pair of bearing seats, and is held approximately parallel to said axis of rotation of said cutting head.

2. A cutting head according to claim 1, in which said pivot pin is unitary with said cutting tool at one end thereof.

3. A cutting head according to claim 2, in which said cutting tool is die cast unitary with said pivot pin.

4. A cutting head according to claim 2, which includes axial grooves provided in the peripheral surface of said pivot pin.

5. A cutting head according to claim 4, in which said axial grooves are provided over the entire axial length of said pivot pin.

6. A cutting head according to claim 1, in which a given bearing seat is unitary with the disc which supports it.

7. A cutting head according to claim 6, in which the radially outer mantle of said bearing seats is respectively approximately axially aligned with the radially outer peripheral edges of said discs.

8. A cutting head according to claim 7, in which said bearing seats partially surround the projecting portions of an associated pivot pin in a range of from at least 180° up to 270°.

9. A cutting head according to claim 8, in which said bearing seats partially surround the projection portions of an associated pivot pin by about 200°.

10. A cutting head according to claim 8, which includes guide elements which are respectively arranged approximately in front of said opening of each bearing seat and extend approximately radially toward said axis of rotation of said cutting head.

11. A cutting head according to claim 10, in which the wall of a respective bearing seat merges into the associated guide elements.

12. A cutting head according to claim 10, in which the guide elements associated with a given bearing seat corresponds at least to the diameter of said pivot pin.

13. A cutting head according to claim 12, in which said guide elements associated with a given bearing seat form an opening angle which opens in the direction of said axis of rotation of said cutting head.

14. A cutting head according to claim 12, in which said guide elements, proceeding from a bearing seat, decrease in height in the radial direction.

15. A cutting head according to claim 12, in which the axis of symmetry of said bearing seat forms an angle with the radial.

16. A cutting head according to claim 15, in which said angle is approximately 5° to 25°.

17. A cutting head according to claim 16, in which said axis of symmetry leads said radial in the direction of rotation of said cutting head.

18. A cutting head according to claim 12, in which said pivot pin is resilient in the radial direction.

19. A cutting head according to claim 18, in which said pivot pin is hollow.

20. A cutting head according to claim 12, which includes a radially flexible metallic band arranged in said bearing seat with radial play relative to the wall of said bearing seat, said metallic band partially surrounding the projecting portions of an associated pivot pin in a range of from more than 180° up to 270°.

21. A cutting head according to claim 20, in which the ends of said metallic band are secured in the associated guide elements.

22. A cutting head according to claim 12, in which said opening of a given bearing seat is radially elastically spreadable.

23. A cutting head according to claim 22, in which said bearing seats are made of an elastic synthetic material.

24. A cutting head according to claim 23, in which said bearing seats are made of a thermoplastic synthetic material.

25. A cutting head according to claim 23, in which said bearing seats are lined with a wear-resistant material.

26. A cutting head according to claim 25, in which said bearing seats are lined with a spring steel plate.

27. A cutting head according to claim 1, in which said main body of said cutting head is unitary.

28. A cutting head according to claim 1, in which the axially outer surfaces of a given pivot pin are slightly axially spaced from the associated disc; and in which the axially inner surface of a given bearing seat is spaced from the associated cutting tool.

* * * * *